United States Patent
Deller et al.

(10) Patent No.: US 7,211,046 B2
(45) Date of Patent: May 1, 2007

(54) SYSTEMS AND METHODS FOR CREATING REFORMATTED COMPUTED TOMOGRAPHY IMAGES

(75) Inventors: Timothy W. Deller, Angola, IN (US); Darin R. Okerlund, Muskego, WI (US); Robert Senzig, Germantown, WI (US)

(73) Assignee: GE Medical Systems Global Technology Company LLC, Waukesha, WI (US)

( * ) Notice: Subject to any disclaimer, the term of this patent is extended or adjusted under 35 U.S.C. 154(b) by 463 days.

(21) Appl. No.: 10/326,023

(22) Filed: Dec. 19, 2002

(65) Prior Publication Data

US 2004/0122309 A1   Jun. 24, 2004

(51) Int. Cl.
*A61B 8/00* (2006.01)

(52) U.S. Cl. .................................................. 600/443

(58) Field of Classification Search ........ 600/440–441, 600/443–447; 128/916; 382/128, 131–132, 382/276, 284–287, 289, 294
See application file for complete search history.

(56) References Cited

U.S. PATENT DOCUMENTS

| | | | | |
|---|---|---|---|---|
| 4,920,573 A * | 4/1990 | Rhodes et al. | ............... | 382/131 |
| 4,939,646 A * | 7/1990 | Essinger et al. | ............ | 382/128 |
| 5,170,347 A * | 12/1992 | Tuy et al. | .................... | 345/419 |
| 5,435,310 A * | 7/1995 | Sheehan et al. | ............. | 600/416 |
| 5,719,498 A * | 2/1998 | Hausmann | ................... | 324/309 |
| 5,734,384 A * | 3/1998 | Yanof et al. | ................. | 345/424 |
| 5,755,666 A * | 5/1998 | Bornert et al. | ................ | 600/410 |
| 5,898,793 A * | 4/1999 | Karron et al. | .............. | 382/131 |
| 5,920,319 A * | 7/1999 | Vining et al. | ............... | 345/420 |
| 6,178,220 B1 * | 1/2001 | Freundlich et al. | ............ | 378/4 |
| 6,201,543 B1 * | 3/2001 | O'Donnell et al. | ......... | 345/420 |
| 6,792,071 B2 * | 9/2004 | Dewaele | ....................... | 378/62 |
| 6,816,607 B2 * | 11/2004 | O'Donnell et al. | ......... | 382/131 |
| 6,995,763 B2 * | 2/2006 | Gatti et al. | .................. | 345/424 |
| 2001/0026637 A1 * | 10/2001 | Lelong et al. | .............. | 382/128 |
| 2002/0054662 A1 * | 5/2002 | Verdonck et al. | ............. | 378/62 |
| 2002/0136437 A1 * | 9/2002 | Gerard et al. | ............... | 382/128 |
| 2003/0068075 A1 * | 4/2003 | Faber et al. | ................. | 382/131 |

* cited by examiner

Primary Examiner—Francis J. Jaworski

(57) ABSTRACT

Systems and methods for creating a reformatted medical diagnostic image of a physical structure of the body including obtaining a plurality of axial images of the physical structure of the body and automatically selecting a plurality of points from the plurality of axial images of the physical structure of the body using an algorithm, wherein the plurality of points define a path associated with the physical structure of the body. The systems and methods also including automatically generating a curved reformatted image of the physical structure of the body along the path associated with the physical structure of the body. The systems and methods further including displaying the curved reformatted image of the physical structure of the body for diagnostic purposes.

12 Claims, 4 Drawing Sheets

SYSTEMS AND METHODS FOR CREATING REFORMATTED COMPUTED TOMOGRAPHY IMAGES

FIELD OF THE INVENTION

The present invention relates generally to computed tomography ("CT") systems and methods. More specifically, the present invention relates to systems and methods for creating reformatted CT images, especially for use in trauma and emergency room ("ER") situations.

BACKGROUND OF THE INVENTION

In trauma and emergency room ("ER") situations, radiologists and the like utilize reformatted computed tomography ("CT") images in order to maximize their diagnostic capabilities. For example, in a trauma or ER situation, a patient may require a CT scan of his or her head, chest, pelvis, spine, or extremities. In such a situation, the time and effort required to analyze axial CT images or the like may delay necessary medical attention. A radiologist may have to sort through a plurality of axial CT images, expending a great deal of time and effort, especially when images of the spine are involved. This compromises the medical needs of the patient.

For example, given conventional CT systems and methods, the radiologist may have to "click" on points associated with a plurality of axial CT images to create a "curved reformat." Such curved reformats provide an enhanced view of a physical structure in question. In other words, points must be selected along a curve of interest, from a plurality of axial CT images, in order to obtain an enhanced view of the physical structure in question. The process of selecting these points may be time-consuming and tedious, especially when a plurality of images, or "thin slices," are involved. Often, the same curved reformat, or "curved view," is created for patients with similar injuries, requiring the radiologist to repeat the same time-consuming, tedious process from patient to patient. As a result, curved views and other similar reformatted CT images are used infrequently, compromising patient care.

Thus, what is needed are systems and methods that maximize the amount of relevant information that a radiologist or the like may obtain from a CT scan, while minimizing the amount of time and the number of clicks that it takes to obtain such information. Accordingly, what is needed are systems and methods for generating a curved reformat or other similar reformatted CT image with as few clicks or point selections as possible.

BRIEF SUMMARY OF THE INVENTION

The systems and methods of the present invention provide an automated trauma or emergency room ("ER") computed tomography ("CT") image reformatting package. The systems and methods of the present invention are designed to minimize the time pressures experienced in the ER and simplify the trauma workflow. Reformatted CT images are automatically generated and made immediately available for analysis following acquisition. Advantageously, the systems and methods of the present invention provide reformatted CT images that are typically created in a repetitive manner, by selecting points from the same physical structure of the bodies of a plurality of patients. A trace is generated to create a curved reformat based on the common geometries of many or all patients. A segmentation algorithm is used to determine the selection points for the radiologist or the like by analyzing the physical structure of a given patient, and the radiologist or the like may add further selection points or edit the selection points chosen by the systems and methods of the present invention.

In one embodiment of the present invention, a method for creating a reformatted medical diagnostic image of a physical structure of the body includes obtaining a plurality of axial images of the physical structure of the body and automatically selecting a plurality of points from the plurality of axial images of the physical structure of the body using an algorithm, wherein the plurality of points define a path associated with the physical structure of the body. The method also includes automatically generating a curved reformatted image of the physical structure of the body along the path associated with the physical structure of the body. The method further includes displaying the curved reformatted image of the physical structure of the body for diagnostic purposes.

In another embodiment of the present invention, a method for creating a reformatted medical diagnostic image of a physical structure of the body includes obtaining a plurality of axial images of the physical, structure of the body and automatically selecting a plurality of points from the plurality of axial images of the physical structure of the body based upon the identity of the physical structure of the body using an algorithm, wherein the plurality of points define a path associated with the physical structure of the body. The method also includes automatically generating a curved reformatted image of the physical structure of the body along the path associated with the physical structure of the body. The method further includes displaying the curved reformatted image of the physical structure of the body for diagnostic purposes.

In a further embodiment of the present invention, a method for creating a reformatted diagnostic image of a physical structure includes obtaining a plurality of axial images of the physical structure and automatically selecting a plurality of points from the plurality of axial images of the physical structure using an algorithm, wherein the plurality of points define a path associated with the physical structure. The method also includes automatically generating a curved reformatted image of the physical structure along the path associated with the physical structure. The method further includes displaying the curved reformatted image of the physical structure for diagnostic purposes.

In a still further embodiment of the present invention, a system for creating a reformatted medical diagnostic image of a physical structure of the body includes a scanner operable for obtaining a plurality of axial images of the physical structure of the body and a first algorithm operable for automatically selecting a plurality of points from the plurality of axial images of the physical structure of the body, wherein the plurality of points define a path associated with the physical structure of the body. The system also includes a second algorithm operable for automatically generating a curved reformatted image of the physical structure of the body along the path associated with the physical structure of the body. The system further includes a display operable for displaying the curved reformatted image of the physical structure of the body for diagnostic purposes.

In a still further embodiment of the present invention, a system for creating a reformatted diagnostic image of a physical structure includes a scanner operable for obtaining a plurality of axial images of the physical structure and a first algorithm operable for automatically selecting a plurality of points from the plurality of axial images of the physical structure, wherein the plurality of points define a path associated with the physical structure. The system also includes a second algorithm operable for automatically generating a curved reformatted image of the physical structure along the path associated with the physical structure. The system further includes a display operable for displaying the curved reformatted image of the physical structure for diagnostic purposes.

DETAILED DESCRIPTION OF THE INVENTION

Figure 1:
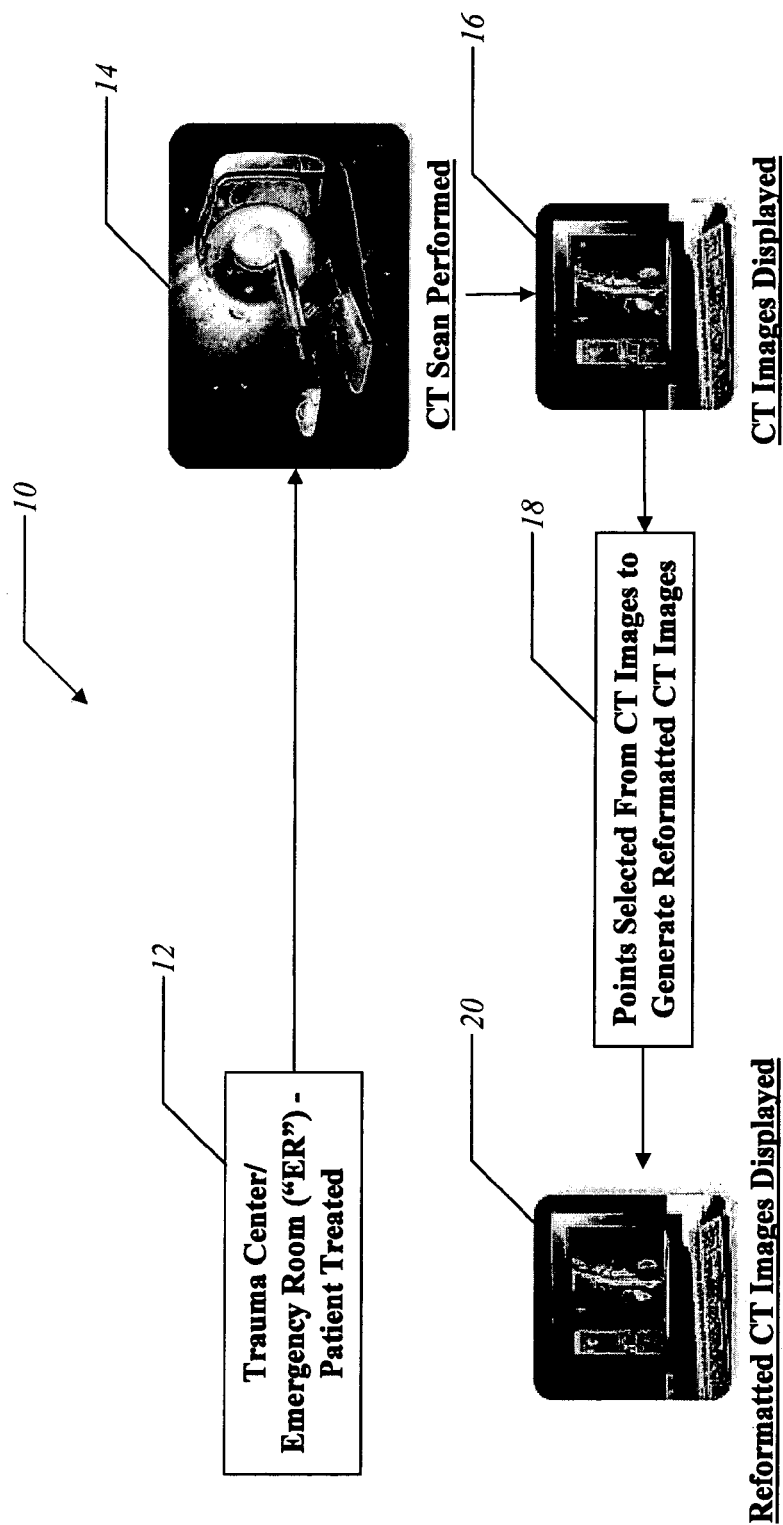
FIG. 1 is a flow diagram illustrating the clinical workflow associated with convention trauma center/emergency room ("ER") computed tomography ("CT") systems and methods.
Figure 2:
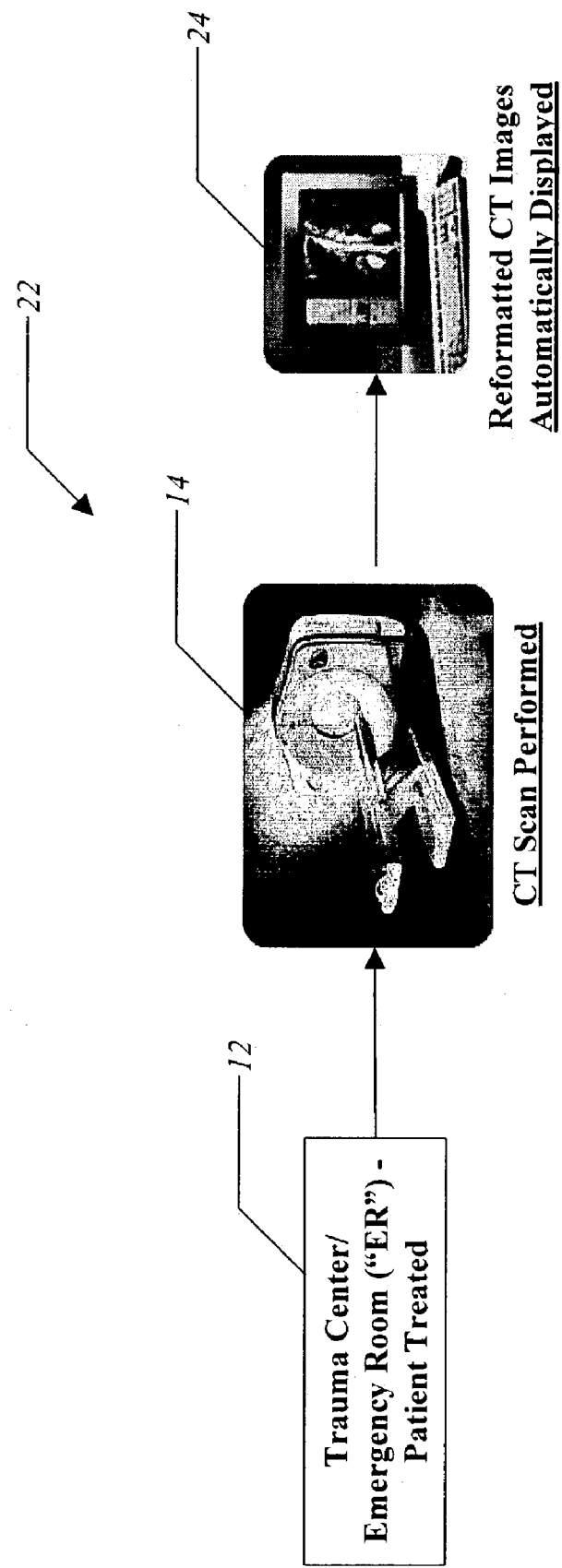
FIG. 2 is a flow diagram illustrating the clinical workflow associated with the trauma center/ER CT systems and methods of the present invention.

FIGS. 1 and 2 illustrate the improvement in clinical workflow provided by the trauma center/emergency room ("ER") computed tomography ("CT") systems and methods of the present invention, as compared to conventional trauma center/ER CT systems and methods. Referring to FIG. 1, with respect to conventional trauma center/ER CT systems and methods 10, after a patient is received and assessed 12, a CT scan is performed 14 and a plurality of CT images are displayed to a radiologist or the like 16. As described above, the radiologist selects points from each of the plurality of CT images in order to generate one or more reformatted CT images 18, such as to generate one or more "curved reformats" from a plurality of axial CT images. This process is typically time-consuming and tedious, potentially compromising patient care. The one or more reformatted CT images are then displayed 20 and used for diagnostic purposes and treatment.

Referring to FIG. 2, with respect to the trauma center/ER CT systems and methods of the present invention 22, one or more reformatted CT images, such as one or more curved reformats, are automatically generated from the plurality of CT images, such as the plurality of axial CT images, and displayed for diagnostic purposes and treatment 24, minimizing the expenditure of radiologist time and effort and enhancing patient care.

In one exemplary embodiment of the present invention, bone segmentation proves useful in the analysis of the cervical spine. Bone produces a unique attenuation wave, and bone segmentation algorithms analyze three-dimensional ("3D") image data in order to isolate bone structures. In trauma and ER situations, the CT systems and methods of the present invention prove useful in the isolation and analysis of the cervical spine. Typically, the spine spans many axial CT images and it is very time-consuming and tedious for a radiologist or the like to scroll through all of these images. Radiologists often use x-ray images to analyze and evaluate the cervical spine. X-ray images, however, are sometimes ineffective for this purpose due to the attenuation of radiation from other structures of the body. The CT systems and methods of the present invention isolate the cervical spine from surrounding bodily structures and automatically create sagittal, coronal, and oblique views of the cervical spine. Advantageously, these views are helpful to the radiologist because they mimic the look and feel of an x-ray image, without the resulting interference from the other structures of the body. From these views, the radiologist may identify problems associated with the cervical spine for diagnosis and which axial CT images to review in further detail.

Figure 3:
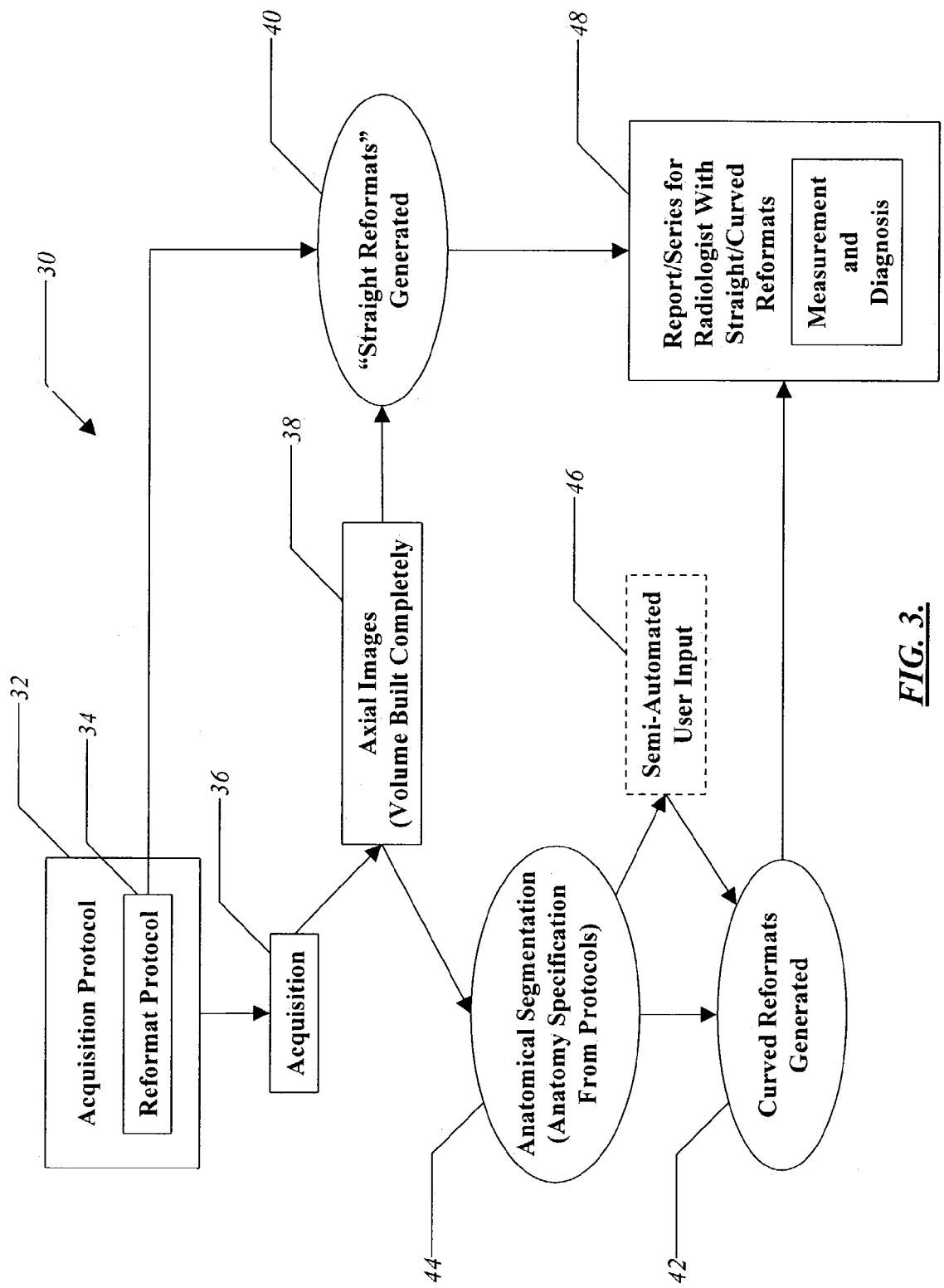
FIG. 3 is a flow diagram illustrating one embodiment of the system/method for creating reformatted CT images of the present invention.

Referring to FIG. 3, in one embodiment of the present invention, prior to performing a CT scan, an acquisition protocol 30 specifies the location of a body to be imaged, as well as the scan location, thickness, and field of view ("FOV"). Likewise, the scan operator may specify the desired reformatted view(s) via a reformat protocol 34. The reformat protocol 34 specifies the reformat orientation, scan location, thickness, FOV, and vasculature or bone structure to follow for reformat creation. Once the proper specifications have been entered, transmitted, and received, images are acquired 36 by the CT scanner (not shown). A plurality of axial CT images are generated 38, building the volume of a physical structure in question completely. From the plurality of axial CT images, one or more "straight reformats" are generated 40 or, alternatively, one or more curved reformats are generated 42. Prior to generating one or more curved reformats 42, an anatomical segmentation is performed 44 using the anatomical specifications from the acquisition protocol 32 and the reformat protocol 34. Optionally, a scan operator may enter additional inputs at this point in the process 46. Finally, a report or series of reformatted CT images is presented to a radiologist or the like for measurement and/or diagnosis 48. Advantageously, using the CT systems and methods of the present invention, reformatted images may be automatically created and displayed alongside axial images after a scan is taken. The acquisition protocol 32 and the reformat protocol 34, described above, may select a path for a curved reformat and the curved view that it creates. The scan operator may then edit the path chosen in order to refine the curved view.

Figure 4:
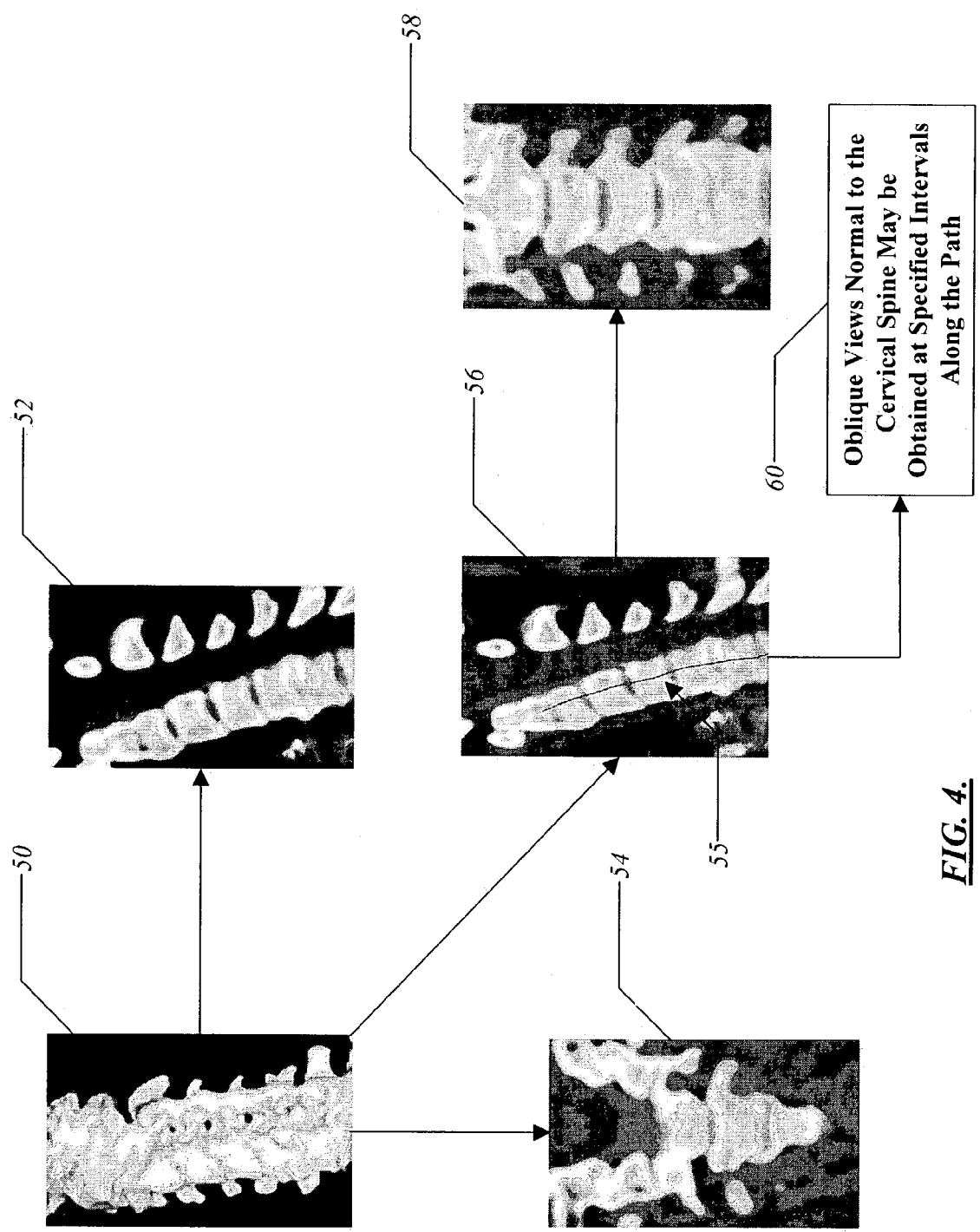
FIG. 4 is photo series illustrating a curved reformat example as may be obtained using the trauma center/ER systems and methods of the present invention.

FIG. 4 illustrates a curved reformat example as may be obtained using the CT systems and methods of the present invention. As described above, systems and methods begin with a 3D "build" 50 of a physical structure in question, such as the cervical spine of a given patient. This 3D build may consist of, for example, a plurality of axial CT images. From the 3D build, a sagittal view 52 may be generated. Likewise, a coronal view 54 may be generated. The acquisition protocol 32 (FIG. 3) and the reformat protocol 34 (FIG. 3) then define a path 55 for a curved reformat 56. Optionally, this path may be edited by the scan operator. One or more curved views are then generated 58. One or more oblique views, normal to the cervical spine, may also be requested and generate at specified intervals along the path 60.

Although the CT systems and methods of the present invention have been shown and described with reference to preferred embodiments and examples thereof, it will be readily apparent to those of ordinary skill in the art that other embodiments and examples may perform similar functions and/or achieve similar results. All such equivalent embodiments and examples are within the spirit and scope of the present invention and are intended to be covered by the following claims.

What is claimed is:

1. A system for creating a reformatted medical diagnostic image of a physical structure of the body, the system comprising:

a scanner operable for obtaining a plurality of parallel axial images of the physical structure of the body;

a first algorithm operable for automatically, without user intervention, selecting a plurality of points from the plurality of parallel axial images of the physical structure of the body, wherein the plurality of points define a path across the plurality of parallel axial images of the physical structure of the body;

a second algorithm operable for automatically generating a curved reformatted image of the physical structure of the body along the path across the plurality of parallel axial images of the physical structure of the body, wherein the curved reformatted image is based in part on a trace comprising common geometries of the physical structure of the body of a plurality of patients; and a display operable for displaying the curved reformatted image of the physical structure of the body for diagnostic purposes.

2. The system of claim 1, further comprising means for manually editing the plurality of points selected from the plurality of axial images of the physical structure of the body prior to the generation of the curved reformatted image of the physical structure of the body.

3. The system of claim 1, wherein the first algorithm is further operable for automatically selecting the plurality of points from the plurality of axial images of the physical structure of the body based upon the identity of the physical structure of the body.

4. The system of claim 1, wherein the first algorithm is further operable for automatically selecting the plurality of points from the plurality of axial images of the physical structure of the body based upon a specification selected from the group consisting of body location, scan location, slice thickness, and field of view.

5. The system of claim 1, wherein the curved reformatted image of the physical structure of the body comprises a view selected from the group consisting of a sagittal view, a coronal view, and an oblique view.

6. The system of claim 1, further comprising a third algorithm operable for displaying one or more of the axial images of the physical structure of the body in proximity to the curved reformatted image of the physical structure of the body at specified intervals along the curved reformatted image of the physical structure of the body.

7. A system for creating a reformatted diagnostic image of a physical structure, the system comprising:

a scanner operable for obtaining a plurality of parallel axial images of the physical structure;

a first algorithm operable for automatically, without user intervention, selecting a plurality of points from the plurality of parallel axial images of the physical structure, wherein the plurality of points define a path across the plurality of parallel axial images of the physical structure;

a second algorithm operable for automatically generating a curved reformatted image of the physical structure along the path across the plurality of parallel axial images of the physical structure, wherein the curved reformatted image is based in part on a trace comprising common geometries of the physical structure of a plurality of sources; and a display operable for displaying the curved reformatted image of the physical structure for diagnostic purposes.

8. The system of claim 7, further comprising means for manually editing the plurality of points selected from the plurality of axial images of the physical structure prior to the generation of the curved reformatted image of the physical structure.

9. The system of claim 7, wherein the first algorithm is further operable for automatically selecting the plurality of points from the plurality of axial images of the physical structure based upon the identity of the physical structure.

10. The system of claim 7, wherein the first algorithm is further operable for automatically selecting the plurality of points from the plurality of axial images of the physical structure based upon a specification selected from the group consisting of structure location, scan location, slice thickness, and field of view.

11. The system of claim 7, wherein the curved reformatted image of the physical structure comprises a view selected from the group consisting of a sagittal view, a coronal view, and an oblique view.

12. The system of claim 7, further comprising a third algorithm operable for displaying the curved reformatted image of the physical structure for diagnostic purposes comprises displaying one or more of the axial images of the physical structure in proximity to the curved reformatted image of the physical structure at specified intervals along the curved reformatted image of the physical structure.

* * * * *